United States Patent [19]
Nishikawa et al.

[11] Patent Number: 4,753,122
[45] Date of Patent: Jun. 28, 1988

[54] SCREW-NUT TYPE MECHANISM

[75] Inventors: Masumi Nishikawa, Toyoake; Masanobu Ishikawa, Nagoya; Hakumi Ishii; Sumio Takizawa, both of Toyota, all of Japan

[73] Assignees: Aisin Seiki Kabushiki Kaisha, Kariya; Toyota Jidosha Kabushiki Kaisha, Toyota, both of Japan

[21] Appl. No.: 844,597

[22] Filed: Mar. 27, 1986

[30] Foreign Application Priority Data

Mar. 30, 1985 [JP] Japan .................................. 60-67507

[51] Int. Cl.4 ........................ F16H 25/24; B62D 1/18
[52] U.S. Cl. .............................. 74/424.8 A; 74/441; 74/89.15; 74/493
[58] Field of Search ............... 74/424.8 R, 424.8 B, 74/424.8 A, 441, 493, 89.15; 411/433, 432, 178; 403/371, 370

[56] References Cited

U.S. PATENT DOCUMENTS

| | | | |
|---|---|---|---|
| 1,122,649 | 12/1914 | Sears | 74/424.8 R |
| 1,955,954 | 4/1934 | Dumser . | |
| 2,195,799 | 4/1940 | Parsons | 74/441 |
| 2,358,954 | 9/1944 | Verderber | 74/441 X |
| 2,567,483 | 9/1951 | Hotline | 74/424.8 B |
| 4,249,426 | 2/1981 | Erikson et al. . | |
| 4,317,384 | 3/1982 | Calvin et al. | 74/424.8 A |
| 4,353,264 | 10/1982 | Erikson et al. . | |
| 4,416,313 | 11/1983 | Seeger | 74/424.8 R |
| 4,434,677 | 3/1984 | Linley, Jr. | 74/89.15 X |
| 4,442,725 | 4/1984 | Urabe | 74/89.15 |
| 4,474,073 | 10/1984 | Blaurock et al. . | |
| 4,602,520 | 7/1986 | Nishikawa et al. | 74/493 |
| 4,633,732 | 1/1987 | Nishikawa et al. . | |
| 4,669,325 | 6/1987 | Nishikawa et al. . | |
| 4,679,457 | 7/1987 | Nishikawa et al. | 74/441 |

FOREIGN PATENT DOCUMENTS 405217 10/1924 Fed. Rep. of Germany .
1928490 1/1970 Fed. Rep. of Germany .
79/00497 2/1980 PCT Int.'l Appl. .

OTHER PUBLICATIONS

Laughner, V., Handbook of Fastening and Joining of Metal Parts, 1st ed., McGraw-Hill Book Co. 1956, pp. 562-563.

Primary Examiner—Randolph A. Reese
Assistant Examiner—Peter M. Cuomo
Attorney, Agent, or Firm—Finnegan, Henderson, Farabow, Garrett & Dunner

[57] ABSTRACT

A screw-nut type driving mechanism having a rotatable screw shaft, a nut engaged with the screw shaft and a driven member secured to the nut. The nut has an axially tapered outer surface which is formed with external threads. The driven member has an internally threaded, axially tapered hole with which the nut is threadably engaged. A retaining plate is provided to hold the nut on the driven member to prevent rotation of the nut.

6 Claims, 5 Drawing Sheets

SCREW-NUT TYPE MECHANISM

BACKGROUND OF THE INVENTION

1. Field of the Invention

The present invention relates to a motion transmitting mechanism for converting a rotational motion to a linear motion. More particularly, the present invention relates to a screw-nut type driving mechanism wherein a rotation of a screw shaft is converted into a linear motion of a nut which is threadably engaged with the screw shaft.

2. Description of the Prior Art

A conventional screw-nut type mechanism includes an externally threaded screw shaft and an internally threaded driven nut which is engaged with the screw shaft. The screw shaft is adapted to be rotated by means of a suitable power source. For the purpose, the screw shaft may be formed with a worm wheel which may be engaged with a worm shaft rotationally driven by a power source. The driven nut is secured to a structural member which is to be driven in a linear direction. Since the driven member is constrained against rotation, a rotation of the screw shaft produces a linear motion of the driven nut and hence causes a linear motion of the driven member.

In a typical example of such screw-nut type driving mechanism, the driven nut is connected to the driven member by fitting the nut to a hole formed in the driven member. For this purpose, the driven nut is formed with an external surface of a polygonal cross-section with the external surface tapered in the axial direction. The hole of the driven member is correspondingly shaped so that the driven nut can be fitted to the hole. The driven nut has an externally threaded portion at the small diameter end which is adapted to project from the driven member and engage a tightening nut so that the driven nut is securely connected to the driven member. In order to provide the driven nut with a radial resiliency or flexibility, the driven nut is formed with radial slits that extend in the longitudinal direction of a portion of the nut so that the nut is divided into a plurality of radially flexible segments.

It has been found, however that, this type of screw-nut driving mechanism is disadvantageous in that, when the tightening nut is applied too strongly, the segments of the driven nut is forced toward the screw shaft with an excessive force increasing the resistance against the rotation of the screw shaft. A further problem in this type of mechanism is that the tapered external surface of the driven nut is rapidly worn or deformed since the driving force is transmitted from the nut to the driven member through the tapered surface of the driven nut. This is particularly true in case where the driven nut is made of a plastic material. Such deformation in the surface of the driven nut causes a play between the driven nut and the driven member.

SUMMARY OF THE INVENTION

It is therefore an object of the present invention to provide a screw-nut type driving mechanism in which the driven nut can tightly be connected with the driven member without producing play.

Another object is to provide a screw-nut type driving mechanism having a novel connection between the driven nut and the driven member, so that the connection does not cause an increase in the resistance to a rotation Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve these objects and in accordance with the purpose of the invention, as embodied and broadly described herein, the screw-nut type driving mechanism of this invention comprises an externally threaded screw shaft which is supported for rotation about its longitudinal axis, an internally threaded driven nut which is threadably engaged with the screw shaft, a driven member connected with the nut, the nut being formed with at least one radial and longitudinal slit for providing the nut with a resiliency in the radial direction, the nut having an axially tapered external surface which is formed with screw threads, the driven member being formed with an axially tapered, internally threaded hole which is engaged with the screw threads in the external surface of the nut and, means being provided for preventing a rotation of the nut with respect to the screw shaft.

According to an embodiment of the present invention, the nut is connected securely to the driven member by screwing the nut into the internally threaded, tapered hole in the driven member. The rotation preventing means is achieved by providing the small diameter end of the nut with a polygonally sectioned configuration and a retaining plate having a polygonal hole fitted to the nut end which may be secured to the driven member. Since the driving force is transmitted from the nut to the driven member through the thread engagement between these elements, it is possible to prevent deformations of the outer surface of the nut.

The accompanying drawings, which are incorporated in and constitute a part of this specification, illustrate one embodiment of the invention and, together with the description, serve to explain the principles of the invention.

DESCRIPTION OF THE PREFERRED EMBODIMENT

Figure 3:
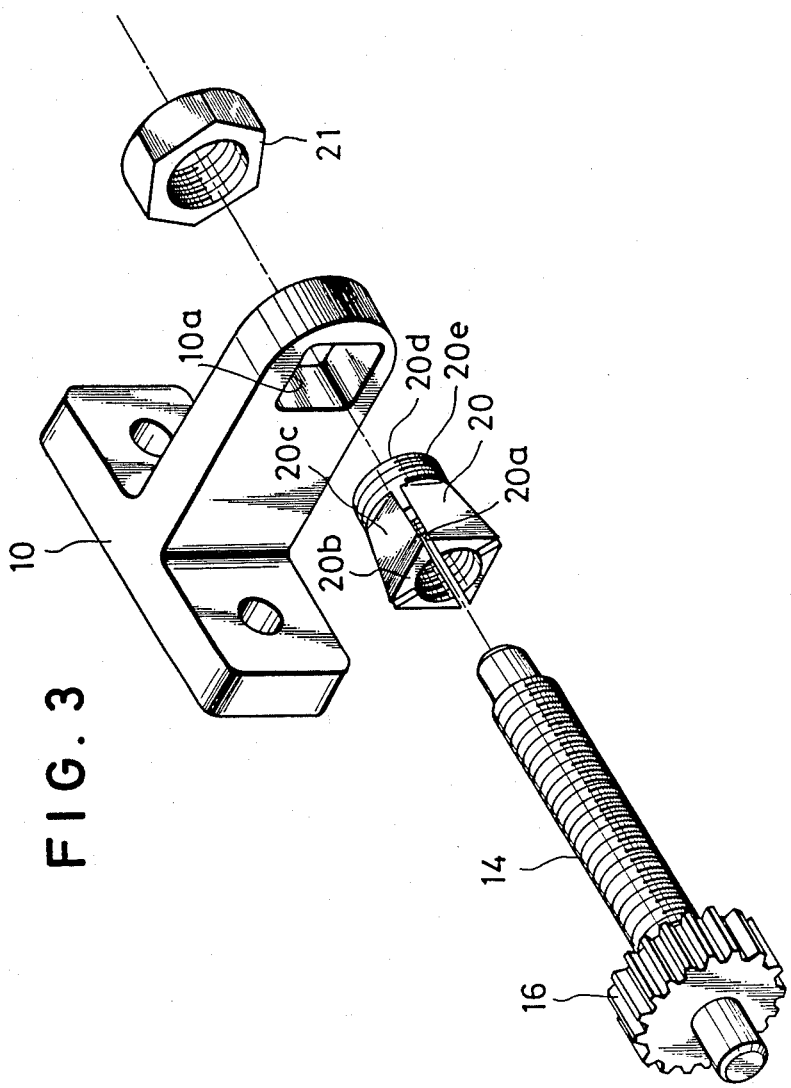
FIG. 3 is an exploded perspective view of a screw-nut type driving mechanism known to the applicants.
Figure 4:
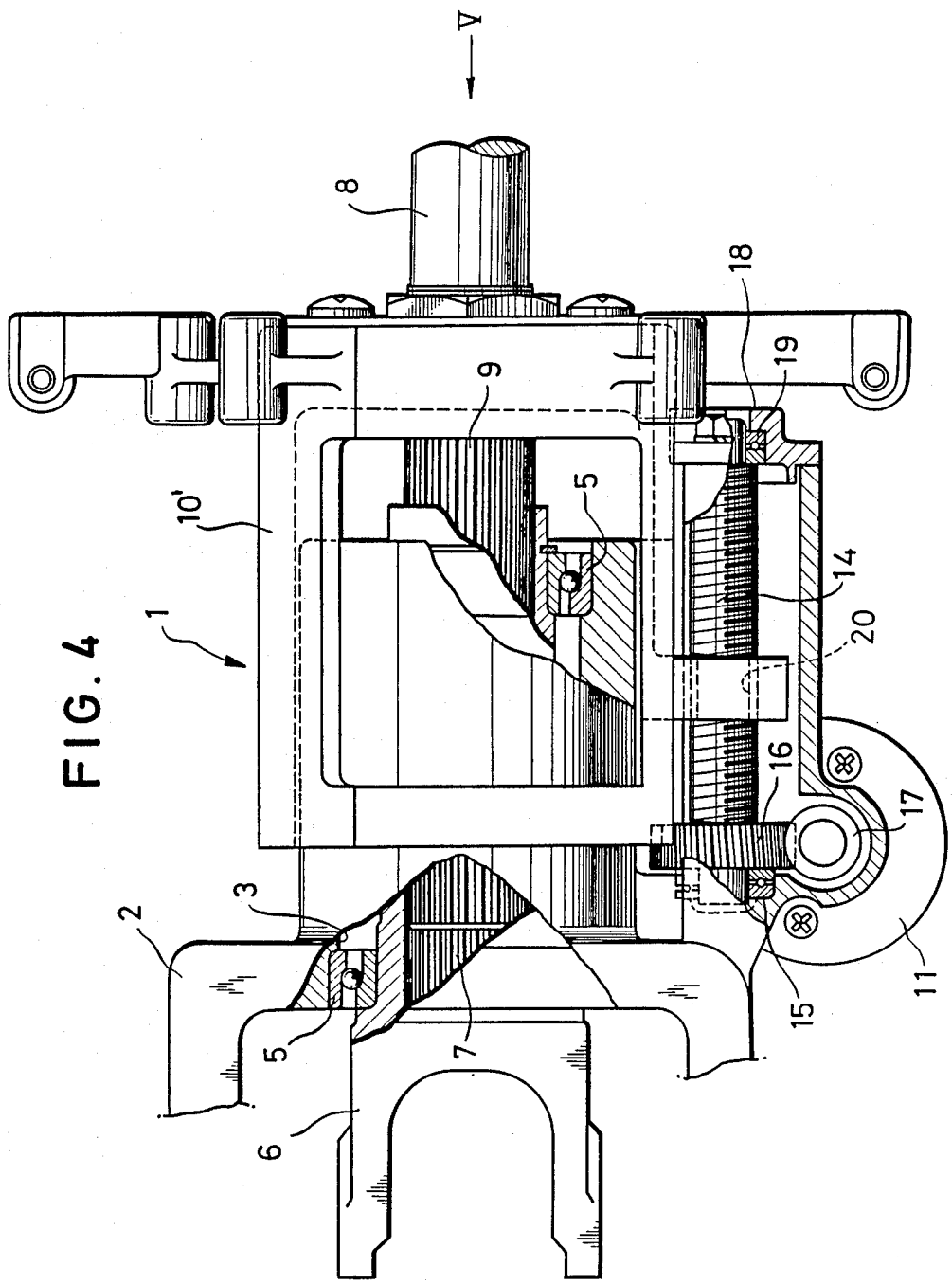
FIG. 4 is a partially cut-away side view of a device known to applicants wherein the screw-nut type driving mechanism is used; and, FIG. 5 is an end view of the device shown in FIG. 4.

Referring at first to FIGS. 3 and 4, there is shown a conventional screw-nut type driving mechanism which includes an externally threaded screw shaft 14 having a worm wheel 16 formed integrally therewith. The screw shaft 14 is engaged with a nut 20 which has a plurality of radial slits 20a which extend longitudinally along a portion of the nut to define a plurality of segments 20b which are flexible in the radial direction. The nut 20 is of a square external cross-sectional configuration and has an outer surface 20c which is axially tapered toward the small diameter end 20d. At the small diameter end 20d, the nut 20 is formed with external screw threads 20e. A driven member 10 is formed with a square hole 10a which is axially tapered to conform to the external configuration of the nut 20. The nut 20 is fitted to the hole 10a and a tightening nut 21 is engaged with the screw threads 20e at the small diameter end of the nut to thereby secure the nut 20 to the driven member 10.

Figure 5:
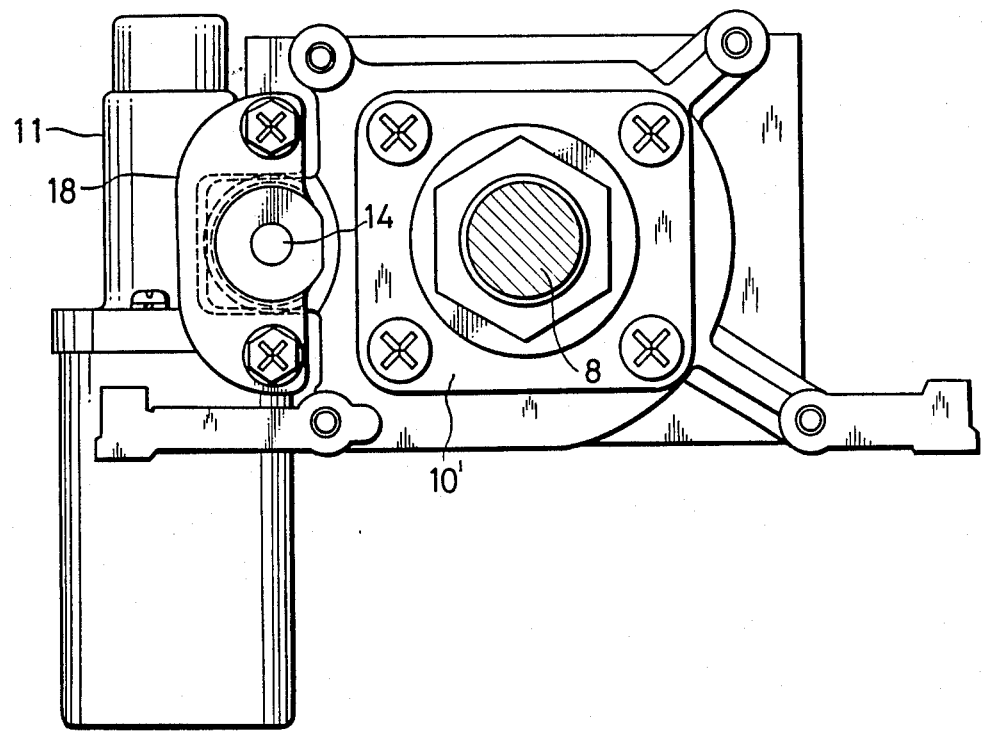

Referring to FIGS. 4 and 5, the device shown therein includes a stationary bracket 2 which has an inner bore 3 where a yoke 6 is rotatably supported by means of axially spaced bearings 5. The yoke 6 is of a hollow structure having an axial bore which telescopically receives a shaft 8. More specifically, the yoke 6 is formed at the axial bore with axial serrations 7 and the shaft 8 is in turn formed with axial serrations 9 which are engaged with the serrations 7 in the yoke 6. The aforementioned driven member 10' supports the shaft 8 for rotation by means of bearings which are not shown so that the shaft 8 is rotatable but not axially movable with respect to the member 10'. Thus, a movement of the member 10' causes an axial movement of the shaft 8 with respect to the yoke 6.

The stationary bracket 2 carries an electric motor 11 at the lower portion thereof. The screw shaft 14 of the aforementioned driving mechanism is supported by the bracket 2 by means of bearings 15 and 19. The motor 11 has an output shaft carrying a worm shaft 17 which is engaged with the worm wheel 16 on the screw shaft 14. Thus, operation of the motor 11 eventually causes an axial telescopic movement of the shaft 8 with respect to the yoke 6 through the screw-nut driving mechanism. This structure can be adopted for example in a vehicle steering column for allowing an adjustment of the position of the steering wheel. As already noted, however, the aforementioned screw-nut type driving mechanism has disadvantages.

Figure 1:
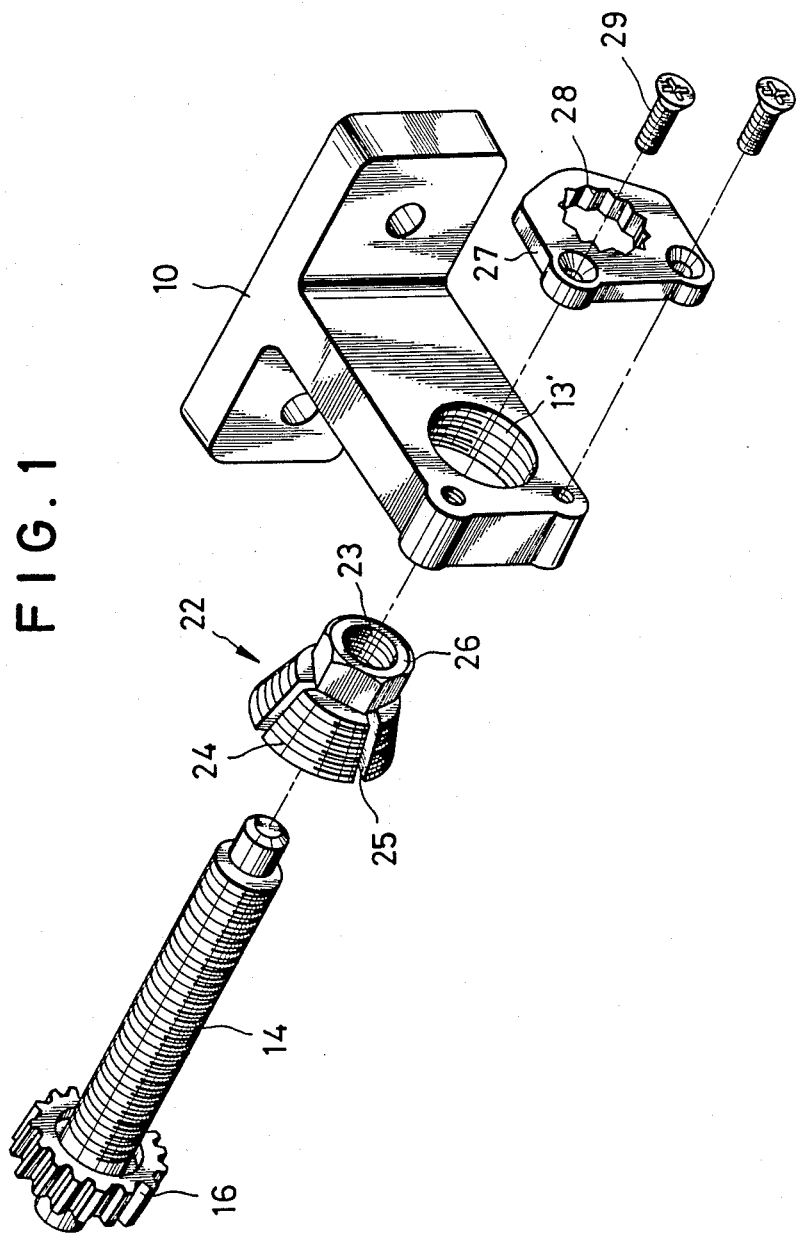
FIG. 1 is an exploded perspective view of a screwnut type driving mechanism in accordance with one embodiment of the present invention.

Referring now to a preferred embodiment of the invention shown FIG. 1, the mechanism shown therein includes a screw shaft 14 which is the same as the screw shaft in the mechanism known to the applicant and formed with a worm wheel 16. The screw shaft 14 is engaged with a nut 22 which has internal threads 23 for receiving the threaded shaft. The nut 22 is formed with radial slits 25 which extend longitudinally along a portion of the nut as in the conventional structure, to define a plurality of segments having a radial resiliency. The nut has an axially tapered outer surface of a circular cross-section, which is formed with external screw threads 24. At the small diameter end, the nut 22 is formed with a hexagonal head. There is a driven member 10 which is formed with an axially tapered hole 13' provided with internal screw threads for engagement with the external screw threads 24 on the nut 22.

The nut 22 is threaded into the hole 13' in the driven member 10 until the nut 22 is radially tightened against the screw shaft 14. In this way, the nut 22 is engaged with the screw shaft 14 without play but with a slight resistance to the rotation of the screw shaft 14. When it is found that there is an excessive play between the nut 22 end the screw shaft 14, the nut 22 is further threaded into the hole 13' in the driven member 10 to make the segments in the nut 22 contract in the radial direction. If the rotation of the screw shaft 14 within the nut is too tight, the engagement of the nut 22 in the hole 13' can be loosened.

In order to hold the nut 22 in the proper position with respect to the driven member, a securing plate 27 is provided which is attached to the member 10 by means of screws 29. The plate 27 has a star-shaped hole 28 wherein two hexagonal configurations are superposed with a concentric but angularly offset relationship. The star-shaped hole 28 is engaged with the hexagonal head 26 of the nut 22 so that the plate 27 constrains the nut 22 against rotation. The plate 27 may be made of any suitable material such as a sintered material or a plastic material.

Figure 2:
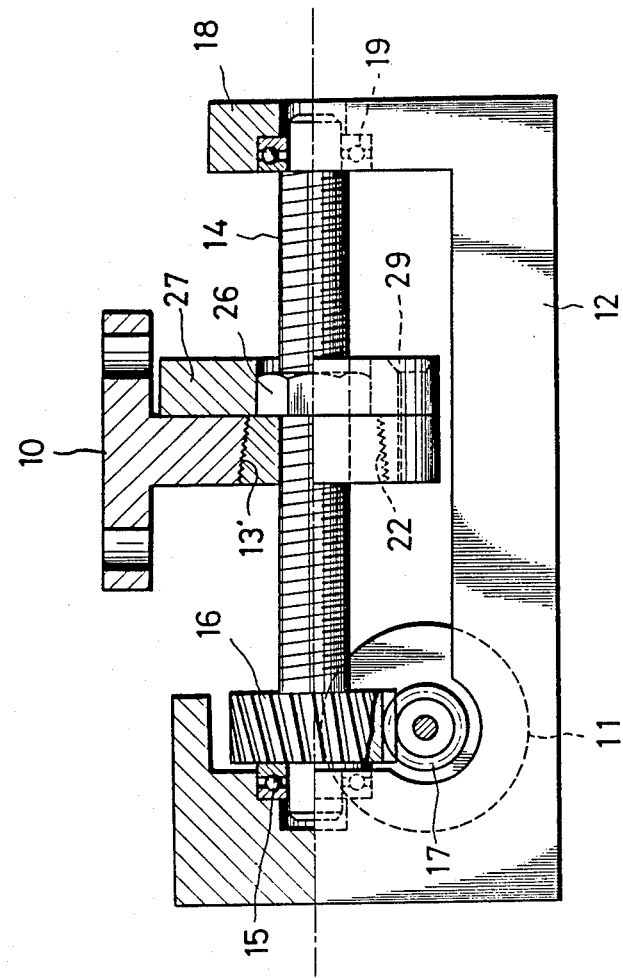
FIG. 2 is a part cross-sectional view of the driving mechanism shown in FIG. 1.

Referring to FIG. 2, it will be noted that the screw shaft 14 having the aforementioned worm wheel 16 is mounted on a screw bracket 18 by means of bearings 15 and 19. The bracket 18 carries a motor 11 having an output worm shaft 17 which is engaged with the worm wheel 16. The rotation of the motor 11 is transmitted through the worm shaft 17 and the worm wheel 16 to the screw shaft 14 to rotate the same. The rotation of the screw shaft 14 then causes the nut 22 to move axially so that the driven member 10 is driven in the axial direction of the screw shaft 14. This mechanism can be adopted in the device shown in FIGS. 4 and 5.

It will be apparent to those skilled in the art that various modifications and variations can be made in the screw-nut type driving mechanism of the present invention without departing from the scope or spirit of the invention. Thus, it is intended that the present invention cover the modifications and variations of this invention provided they come within the scope of the appended claims and their equivalents.

We claim:

1. A screw-nut type driving mechanism comprising:
    an externally threaded screw shaft supported for rotation about the longitudinal axis thereof;
    nut means having internal threads threadably engaging said screw shaft, said nut means including a first portion having an axially tapered external frustoconical surface with screw threads thereon, said first portion having at least one radial slit therein for providing resiliency in a radial direction, and said nut means including a second portion having a polygonal head;
    a non-rotatable driven member having an axially tapered internally threaded hole threadably engaging the threaded external tapered surface of said first portion of said nut means for connecting said non-rotatable driven member to said nut means; and
    means connecting said non-rotatable driven member to said nut means to prevent rotation of said nut means relative to said driven member during rotation of said screw shaft, said rotation preventing means including a retaining plate secured to said driven member and having an aperture with a peripheral surface of a polygonal configuration for engaging said polygonal head of said nut means.

2. A screw-nut type driving mechanism in accordance with claim 1, said polygonal head being formed at one end of said nut means, said one end having a smaller diameter than an opposing end of said nut means.

3. A screw-nut type driving mechanism in accordance with claim 1, wherein said polygonal head is hexagonal and wherein said peripheral edge of said hole of said driven member has a peripheral configuration adapted to be fitted to said hexagonal head.

4. A screw-nut type driving mechanism in accordance with claim 3, said hole in said driven member being formed in a plate-like extension secured to the driven member.

5. A screw-nut type driving mechanism in accordance with claim 3, said hole in the driven member having a configuration including two superposed hexagonal shapes having a concentric but angularly offset relationship.

6. A screw-nut type driving mechanism for a motor vehicle, comprising:

stationary bracket means secured to a body of the motor vehicle;

yoke means rotatably supported on said stationary bracket means and having a bore extending in an axial direction which telescopically receives shaft means, said yoke means being rotatable with said shaft means;

driven member means operatively connected to said shaft means for moving along said shaft means in an axial direction, said driven member means including an axially tapered internally threaded hole;

externally threaded screw shaft means rotatably supported on said stationary bracket means in parallel relation with said shaft means;

nut means having internal threads for threadably engaging said screw shaft means, said nut means including a first portion having an axially tapered external frusto-conical surface with screw threads thereon, said first portion having at least one radial slit therein for providing resiliency in a radial direction, and said nut means including a second portion having a polygonal head, said external screw threads of said first portion of said nut means for threadably engaging said internal threads of said hole in said driven member means;

means connecting said driven member means to said nut means to prevent rotation of said nut means relative to said driven member means during rotation of said screw shaft means, said rotation preventing means including a retaining plate secured to said driven member means and having an aperture with a peripheral surface of a polygonal configuration for engaging said polygonal head of said nut means; and means for rotating said screw shaft means, the rotation of said screw shaft means causing axial movement of said nut means and said driven member means, said axial movement of said driven member means causing axial movement of said shaft means with respect to said yoke means.

* * * * *